United States Patent [19]

Takayama

[11] Patent Number: 5,466,539
[45] Date of Patent: Nov. 14, 1995

[54] HIGH PERMEABILITY IRON-BASED ALLOY

[75] Inventor: Shinji Takayama, Mitaka, Japan

[73] Assignee: International Business Machines Corporation, Armonk, N.Y.

[21] Appl. No.: 179,002

[22] Filed: Jan. 7, 1994

[30] Foreign Application Priority Data

Jan. 14, 1993 [JP] Japan .................................. 5-004763

[51] Int. Cl.$^6$ .................................................. G11B 5/706
[52] U.S. Cl. .................. 428/611; 428/694 MT; 428/694 XS; 428/694 T; 428/694 TM; 148/306
[58] Field of Search .................. 148/306, 307; 428/611, 694 MT, 694 XS, 694 T, 694 TM

[56] References Cited

U.S. PATENT DOCUMENTS

| | | | |
|---|---|---|---|
| 3,908,194 | 9/1975 | Romankiw | 360/113 |
| 4,969,962 | 11/1990 | Watanabe et al. | 148/307 |
| 5,227,212 | 7/1993 | Ahlert et al. | 428/694 TM |
| 5,264,981 | 11/1993 | Campbell et al. | 428/693 |
| 5,302,469 | 4/1994 | Sugenoya et al. | 428/611 |

FOREIGN PATENT DOCUMENTS 64-24403  1/1989  Japan .
3-166704  7/1991  Japan .

OTHER PUBLICATIONS

Y. Yoshizawa et al., "Fe Based Soft Magnetic Alloys Composed of Ultrafine Grain Structure", J. Japan Inst. Metals, vol. 53, 1989, pp. 241–248.

K. Nakanishi et al., "Magnetic Properties of Fe–X–N (Z=Zr, Hf,Nb,Ta) Films", J. Mag. Soc. Japan, vol. 15, 1991, pp. 371–374.

N. Hasegawa et al., "Carbide–dispersed Nanocrystalline Soft Magnetic Films", Bull. Japan Inst. Metals, vol. 30(8), 1991, pp. 685–694.

A. Kojima et al., Japan Inst. Metals Spring Meeting Abstract, 1992, 4, p. 187.

*Primary Examiner*—George Wyszomierski
*Attorney, Agent, or Firm*—Ingrid M. Foerster

[57] ABSTRACT

A high permeability Fe-based alloy having a composition of $(Fe_aM_{100-a})_{100-b}X_b$, wherein M represents at least one element selected from a group consisting of Nb, Zr, Ta, Hf, Ti, V, and Si, and X represents hydrogen or oxygen. The letters a and b represent atomic percentages, wherein preferably $85<=a<=97$ and $4<=b<=10$. In the preferred embodiment, the alloy comprises a nano-scale alpha-Fe crystalline phase having a grain size of less than 20 nm.

24 Claims, 3 Drawing Sheets

| ALLOY COMPOSITION | SATURATION MAGNETIZATION Bs (T) | COERCIVITY Hc (Oe) | INITIAL PERMEABILITY $\mu i$ (5 MHz) |
|---|---|---|---|
| $(Fe_{90}Ta_{10})_{92}H_8$ | 1.7 | 0.03 | 4000 |
| $(Fe_{95}Ti_5)_{96}H_4$ | 2.1 | 0.05 | 3000 |
| $(Fe_{88}Nb_{12})_{94}H_6$ | 1.8 | 0.03 | 3500 |
| $(Fe_{95}Zr_5)_{95}H_5$ | 2.0 | 0.02 | 3500 |
| $(Fe_{88}Hf_{12})_{91}H_9$ | 1.7 | 0.04 | 3000 |
| $(Fe_{90}V_{10})_{95}H_5$ | 1.9 | 0.03 | 3000 |
| $(Fe_{90}Ti_{10})_{95}O_5$ | 1.8 | 0.02 | 3000 |
| $(Fe_{95}Nb_5)_{84}O_6$ | 1.9 | 0.03 | 3500 |
| $(Fe_{92}Ta_8)_{95}O_5$ | 1.7 | 0.04 | 3000 |
| $(Fe_{90}Ta_5Nb_5)_{95}H_5$ | 1.8 | 0.03 | 3500 |
| $(Fe_{88}Zr_3Nb_9)_{96}H_4$ | 1.8 | 0.02 | 4000 |
| $(Fe_{91}Ti_5Zr_4)_{96}O_4$ | 1.9 | 0.025 | 3000 |
| $(Fe_{91}Hf_4Nb_5)_{95}O_5$ | 1.8 | 0.04 | 3000 |
| $(Fe_{95}Si_5)_{95}O_5$ | 2.0 | 0.03 | 3500 |

FIG. 1

| ALLOY COMPOSITION | SATURATION MAGNETIZATION Bs (T) | COERCIVITY Hc (Oe) | INITIAL PERMEABILITY $\mu i$ (5 MHz) |
|---|---|---|---|
| $(Fe_{90}Ta_{10})_{92}H_8$ | 1.7 | 0.03 | 4000 |
| $(Fe_{95}Ti_5)_{96}H_4$ | 2.1 | 0.05 | 3000 |
| $(Fe_{88}Nb_{12})_{94}H_6$ | 1.8 | 0.03 | 3500 |
| $(Fe_{95}Zr_5)_{95}H_5$ | 2.0 | 0.02 | 3500 |
| $(Fe_{88}Hf_{12})_{91}H_9$ | 1.7 | 0.04 | 3000 |
| $(Fe_{90}V_{10})_{95}H_5$ | 1.9 | 0.03 | 3000 |
| $(Fe_{90}Ti_{10})_{95}O_5$ | 1.8 | 0.02 | 3000 |
| $(Fe_{95}Nb_5)_{84}O_6$ | 1.9 | 0.03 | 3500 |
| $(Fe_{92}Ta_8)_{95}O_5$ | 1.7 | 0.04 | 3000 |
| $(Fe_{90}Ta_5Nb_5)_{95}H_5$ | 1.8 | 0.03 | 3500 |
| $(Fe_{88}Zr_3Nb_9)_{96}H_4$ | 1.8 | 0.02 | 4000 |
| $(Fe_{91}Ti_5Zr_4)_{96}O_4$ | 1.9 | 0.025 | 3000 |
| $(Fe_{91}Hf_4Nb_5)_{95}O_5$ | 1.8 | 0.04 | 3000 |
| $(Fe_{95}Si_5)_{95}O_5$ | 2.0 | 0.03 | 3500 |

HIGH PERMEABILITY IRON-BASED ALLOY

FIELD OF THE INVENTION

The present invention relates generally to iron-based alloys and more particularly to a high permeability iron-based alloy suitable for use in high density magnetic recording systems, and a method for making the same.

BACKGROUND OF THE INVENTION

Soft magnetic materials are used in a variety of applications including magnetic heads, transformers, and magnetic shields. For example, U.S. Pat. No. 3,908,194 describes an integrated magnetoresistive read/inductive write head which includes soft magnetic permalloy shielding layers and a soft magnetic biasing layer in the MR stripe "sandwich". Desirable characteristics in such materials include low magneto-stiction, high saturation magnetization, high permeability, and low coercivity. The advantages associated with these characteristics should be familiar to those of ordinary skill in the art and will not be explained further.

A number of iron-based alloy films have been developed in recent years in an attempt to improve the foregoing characteristics. One approach has been to form amorphous thin films by conventional methods and to anneal them at a temperature of about 550° C. in order to segregate a highly saturated α-Fe solid solution phase having a grain size of approximately 10 nm or less. The resulting alloys have high permeability, low magneto-stiction and saturation magnetization of 1.6–1.7 T. For example, Y. Yoshizawa and K. Yamauchi, disclose an alloy comprising Fe-Nb-Cu-Si-B in J. Japan Inst. Metals, Vol. 53 (1989) p. 241. K. Nakanishi et al. disclose an alloy having a composition of Fe-X-N, wherein (X=Zr, Hf, Nb or Ta) in J. Mag. Soc. Japan, Vol. 15 (1991) p. 371. N. Hasegawa et al. discusses an alloy comprising Fe-X-C where (X=Zr, Nb or Ta) in Bull. Japan Inst. Metals, Vol. 30(8) (1991) p. 685.

In another approach, a nano-scale crystalline Fe-M-O thin film (M=Y, Ce) is obtained through sputtering, as disclosed by A. Kojima and A. Makino in Japan Inst. Metals Spring Meeting Abstract, (1992) 4, p.187. The characteristics of the Fe-M-O thin films include saturation magnetization $B_s$=1.95 T, coercivity $H_c$ =0.60 e, an initial permeability μi (1 Mhz)=1200, and magneto-stiction $λs$=1.1×10$^{-6}$.

An Fe-M-O film is also disclosed in PUPA No. 64-24403, wherein M represents at least one element selected from the group comprising (Ti, Zr, V, Nb, Ta, Cr, Mo, W, Mn, Re, Os, Co, Ni, B, C, Al, Si, Ga, Ge, Sn, P, and Sb), the atomic percentage of which is less than 20 atomic percent. The oxygen composition of the film in atomic percentage ranges from 0.005 to 3%. The application further explains that the soft magnetic characteristics of the alloy can be improved by laminating films containing the described composition over heat resistant oxides like silicon oxide or holsterite. Immediately after sputtering, the laminated films have a saturation magnetization $B_s$ of approximately 2T, coercivity $H_c$ of 0.50 e, and an initial permeability $μ_i$ (1 Mhz) of 1800. Such coercivity and permeability values, however, do not reach the technological level suited for high density magnetic recording.

Yet another approach attempted to improve the characteristics of iron-based alloys has been to prepare bulk material by a conventional alloy powder method. For example, PUPA No. 3-153851 discloses soft magnetic materials comprising Fe-M-X where (M=Co, Mo, Ti, Cu, Y, Ge, Gd, Sm, Nd, Dy, Si, and P); and X=N and H. However, the coercivity of such alloys is higher than that of the materials disclosed in PUPA No. 64-24403, making them unsuitable for high density magnetic recording.

What is needed is a soft magnetic material wherein the magneto-stiction, saturation magnetization, permeability and coercivity characteristics meet the technological requirements for high density magnetic recording.

SUMMARY OF THE INVENTION

It is therefore an object of the present invention to provide iron-based magnetic materials having high permeability, high saturation magnetization, low coercivity and low magneto-stiction suitable for making thin film magnetic heads and other thin film structures.

In brief, an alloy film essentially comprising iron and at least one element selected from the group including Nb, Zr, Ta, Hf, Ti, V, and Si is prepared by sputtering, chemical vapor deposition (CVD) or other suitable means in a gas atmosphere including hydrogen or oxygen. Each group element easily forms hydrogen compounds or oxides by combining with hydrogen or oxygen, and plays a role in greatly suppressing grain growth during a subsequent annealing process. Alloys prepared in the manner described generally have a grain size of less than 20 nm. The iron content of the alloy is preferably between 85 and 97% and the content of oxygen or hydrogen in atomic percentage is preferably between 4 and 10%. (The unit is atomic percentage in all elements.) These ratios are required to attain an effect of forming trace hydrogen compounds or oxides in the films while retaining the magnetic properties of Fe and simultaneously suppressing the grain growth during annealing.

Nano-scale crystalline structure alloys prepared by the preceding method were experimentally found to have a magneto-stiction as low as $10^{-6}$–$10^{-7}$. Optimized structures were shown to have a saturation magnetization $B_s$ of about 1.7–2.1 T and an initial permeability of 3000 or more (5 MHz).

BRIEF DESCRIPTION OF THE DRAWINGS

FIG. 1 is a table showing the flux density $B_s$, coercivity $H_c$, and the initial permeability $μ_s$ at 5 MHz for 14 alloys prepared according to the method of the present invention;

DETAILED DESCRIPTION OF THE PREFERRED EMBODIMENT

The present invention will now be explained in detail with reference to a particular embodiment, although it should be understood that a number of alternative methods may be used to achieve the same result without departing from the nature and scope of the invention as set forth in the claims.

A 1.5 μm thick Fe-based alloy film containing hydrogen or oxygen is prepared over a 0.5 mm thick $SiO_2$-based board by RF sputtering using $Fe_{90}M_{10}$ alloy targets (M=Nb, Zr, Hf, Ti, Ta, Si, and Hf) in a mixed gas of Ar+5% $H_2$ and Ar+3%

$O_2$ under a total pressure of less than 10 m Torr.

The film is subsequently annealed at an atmospheric temperature of approximately 400° to 600° C. for at least 30 minutes. The resulting alloy is a segregated super saturated α-Fe solid solution having a grain size of less than 20 nm, reduced magneto-stiction, and dispersed crystalline anisotropy. In the preferred method, an atmospheric temperature of between 500° and 580° C. is maintained for 1–2 hours in an atmosphere of hydrogen gas or under vacuum. The table of FIG. 1 indicates the representative saturated magnetic flux density $B_s$, coercivity $H_c$, and initial permeability $\mu_i$ (5 MHz) of the alloy. All of the magnetic films shown in the table of FIG. 1 have a magneto-stiction of $1\times10^{-6}$ or less.

Figure 2:
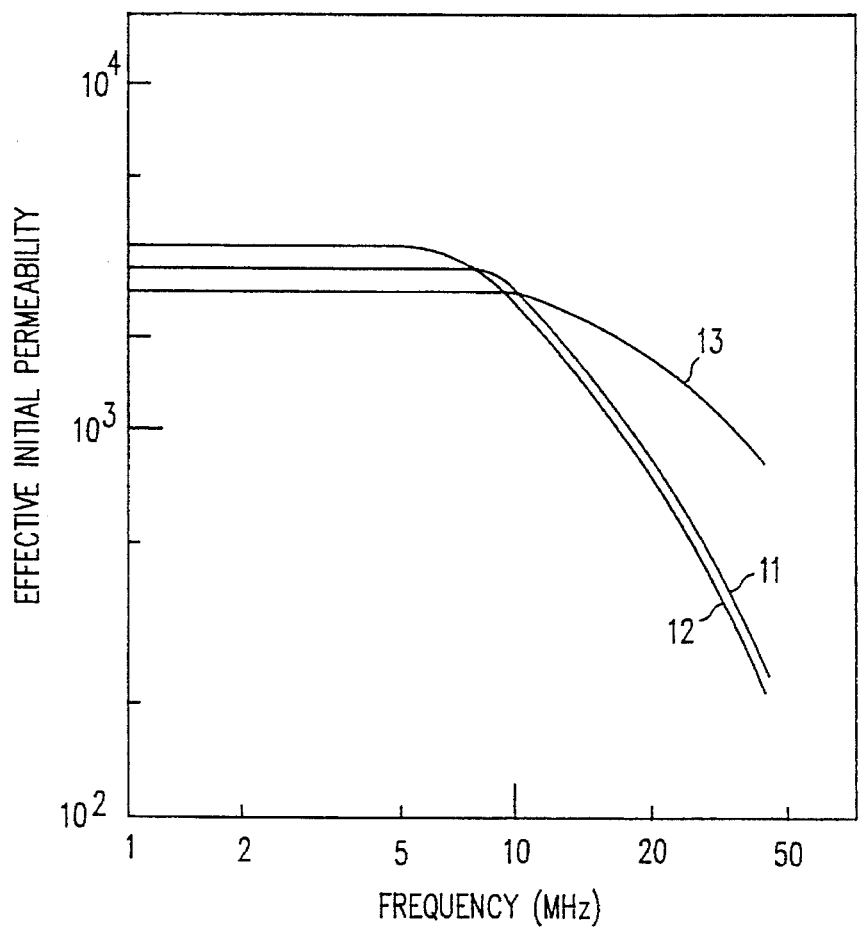
FIG. 2 is a graphical representation illustrating the frequency dependency of the initial permeability of the magnetic film.

FIG. 2 illustrates the frequency dependency of the initial permeability (in MHz) of three alloys prepared by the preceding method: $(Fe_{95}Ti_5)_{92}H_8$ (11), $(Fe_{88}Nb_{12})_{95}H_5$ (12) and $(Fe_{90}Ti_{10})_{93}O_7$ (13). The structure of each film shown in FIGS. 1 and 2 mainly comprises a super saturated α-Fe solid solution phase having a grain size of less than 20 nm. As is clear from these figures, the Fe-based alloy film of the present invention exhibits favorable characteristics, i.e., saturation magnetization $B_s$ of 1.5 T or more, and initial permeability μi (5 MHz) of 3000 or more. Each of these Fe-based alloy films is well suited for use in thin film magnetic head structures for high density recording since its initial permeability is sufficiently high, even at frequencies of up to 5 MHz. Moreover, the coercivity of the film is 0.050 e or lower.

It should be understood by those of ordinary skill in the art that the Fe-based alloy film of the present invention may be prepared by methods other than RF sputtering, e.g., DC sputtering or evaporation. Any film-forming method used should be carried out in either an oxygen or hydrogen mixture so that oxygen or hydrogen is incorporated into the Fe-based alloy film.

Figure 3:
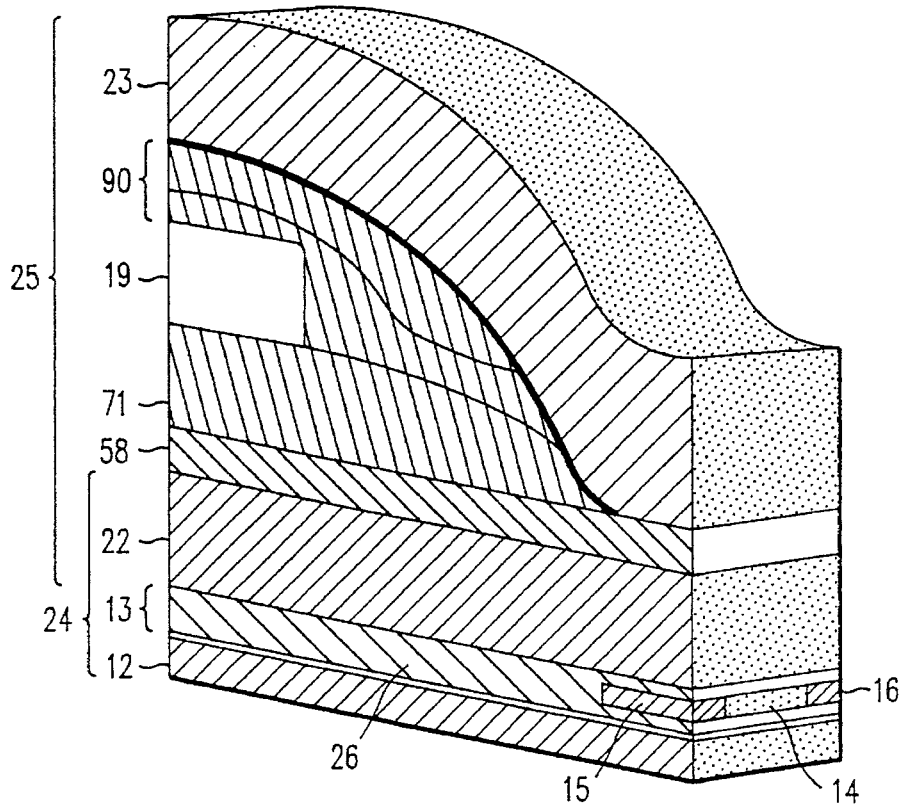
FIG. 3 is a cross-section of an MR read/inductive write head assembly.
Figure 4:
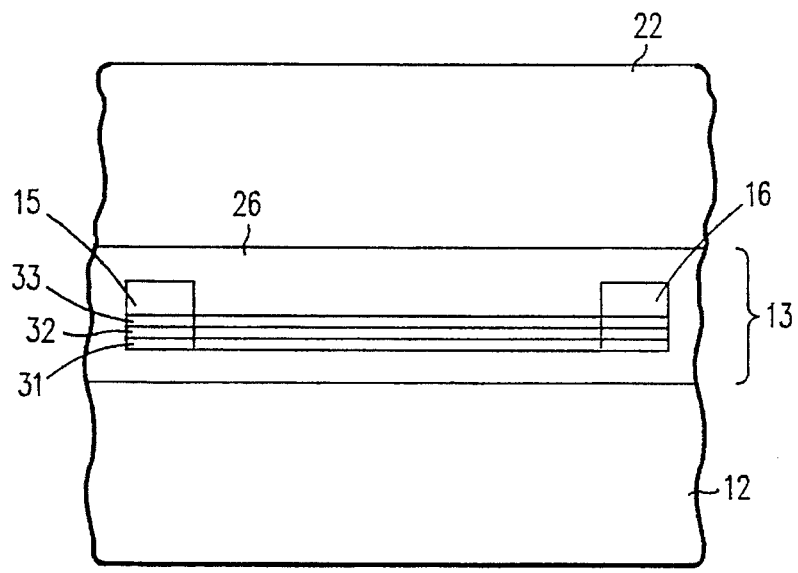
FIG. 4 is a plane view of the magnetoresistive element in an MR head assembly.

One example of an application for the claimed Fe-based alloy is a magnetic recording head such as that shown in FIG. 3. It includes a magnetoresistive read head subassembly 24 comprising a soft magnetic shielding layer 12, a read gap 13 of insulating material 26; a thin film magnetoresistive stripe 14 formed within the read gap 13 and coupled to MR leads 15, 16, and an upper shielding layer 22 which serves as the lower pole piece of the inductive write head assembly 25. The MR stripe comprises, for example, a three-layer sandwich such as that shown in FIG. 4, including a bias layer 31, a nonmagnetic separator layer 32, and a magnetoresistive layer 33. Any or all of the shielding layers 12, 22 and bias layer 31 comprise the soft ferromagnetic iron-based alloy of the present invention. The magnetic head shown in FIGS. 3 and 4 is otherwise formed by conventional methods known to those of ordinary skill in the art and will not be discussed in further detail. It should be understood that the magnetic head of FIGS. 3 and 4 is exemplary only, and that the present invention may be utilized in a variety of magnetic head designs.

Figure 5:
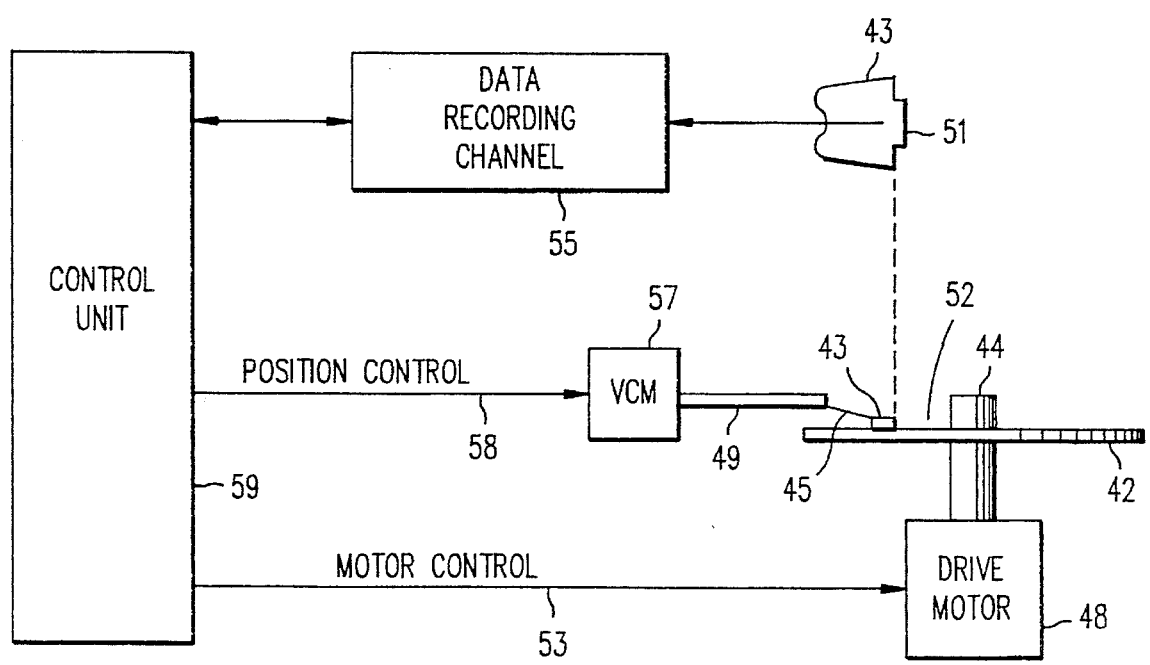
FIG. 5 is a block diagram of a magnetic storage system.

FIG. 5 shows a magnetic disk storage system incorporating an MR read head including the Fe-based alloy of the present invention. Although the invention is described as embodied in a magnetic disk storage system as shown in FIG. 5, it should be apparent that the invention is also applicable to other magnetic recording systems such as a magnetic tape recording system, for example, or other applications utilizing a magnetoresistive read head. A magnetic disk storage system comprises at least one rotatable magnetic disk 42 supported on a spindle 44 and rotated by a disk drive motor 48 with at least one slider 43 positioned on the disk 42, each slider 43 supporting one or more magnetic read/write heads 51. The magnetic recording media on each disk is in the form of an annular pattern of concentric data tracks (not shown) on disk 42. As the disks rotate, the sliders 43 are moved radially in and out over the disk surface 52 so that the heads 51 may access different portions of the disk 42 where desired data is recorded. Each slider 43 is attached to an actuator arm 49 by means of a suspension 45. The suspension 45 provides a slight spring force which biases the slider 43 against the disk surface 52. Each actuator arm 49 is attached to an actuator means 57. The actuator means as shown in FIG. 5 may be a voice coil motor (VCM), for example. The VCM comprises a coil moveable within a fixed magnetic field, the direction and velocity of the coil movements being controlled by the motor current signals supplied by a controller.

During operation of the disk storage system, the rotation of the disk 42 generates an air bearing between the slider 43 and the disk surface 52 which exerts an upward force or lift on the slider. The air bearing thus counterbalances the slight spring force of the suspension 45 and supports the slider 43 off and slightly above the disk surface 52 by a small, substantially constant spacing during operation.

The various components of the disk storage system are controlled in operation by control signals generated by control unit 59, such as access control signals and internal clock signals. Typically, the control unit 59 comprises logic control circuits, storage means and a microprocessor, for example. The control unit 59 generates control signals to control various system operations such as drive motor control signals on line 53 and head position and seek control signals on line 58. The control signals on line 58 provide the desired current profiles to optimally move and position a selected slider 43 to the desired data track on the associated disk 42. Read and write signals are communicated to and from read/write heads 51 by means of recording channel 55.

The above description of a typical magnetic disk storage system, and the accompanying illustration of FIG. 5 are for representation purposes only. It should be apparent that disk storage systems may contain a large number of disks and actuators, and each actuator may support a number of sliders.

We claim:

1. An Fe-based alloy having a composition of $(Fe_aM_{(100-a)})_{(100-b)}H_b$, wherein M represents at least one element selected from the group consisting of Nb, Zr, Ta, Hf, Ti, V, and Si, and wherein a and b are atomic percentages having values such that $85<=a<=97$ and $4<=b<=12$.

2. The Fe-based alloy of claim 1, wherein said alloy substantially comprises nano-scale α-Fe crystalline phase having grain size less than 20 nm.

3. The Fe-based alloy of claim 1, wherein said alloy is in a film state.

4. A thin-film magnetic read head comprising:
   a first shielding layer;
   a read gap of insulating material formed on said first shielding layer;
   a magnetoresistive stripe disposed within said read gap and including a biasing layer of soft magnetic material, said soft magnetic material comprising,
   an Fe-based alloy having a composition of $(Fe_aM_{(100-a)})_{(100-b)}H_b$, wherein M represents at least one element selected from the group consisting of Nb, Zr, Ta, Hf, Ti, V, and Si, and wherein a and b are atomic percentages having values such that $85<=a<=97$ and $4<=b<=12$;

first and second conductive elements coupled to said magnetoresistive stripe; and a second shielding layer formed over said read gap and electrically isolated from said magnetoresistive stripe and said first and second conductive elements.

5. The thin-film head of claim 4, wherein said Fe-based alloy substantially comprises nano-scale α-Fe crystalline phase having grain size less than 20 nm.

6. The thin-film head of claim 4, wherein one of said first and second shielding layers comprises said Fe-based alloy.

7. The thin-film head of claim 4, wherein each of said first and second shielding layers comprises said Fe-based alloy.

8. A data storage system comprising:

a magnetic storage medium having a recording surface;

a slider for supporting a magnetic head assembly in close proximity to said recording surface, said magnetic head assembly including a thin-film magnetic read head comprising, a first shielding layer, a read gap of insulating material formed on said first shielding layer, a magnetoresistive stripe disposed within said read gap and including a biasing layer of soft magnetic material, said soft magnetic material comprising, an Fe-based alloy having a composition of $(Fe_a M_{(100-a)})_{(100-b)} H_b$, wherein M represents at least one element selected from the group consisting of Nb, Zr, Ta, Hf, Ti, V, and Si, and wherein a and b atomic percentages having values such that $85<=a<=97$ and $4<=b<=12$, first and second conductive elements coupled to said magnetoresistive stripe, and a second shielding layer formed over said read gap and electrically isolated from said magnetoresistive stripe and said first and second conductive elements; and means for providing relative motion between said magnetic head assembly and said recording surface.

9. The data storage system of claim 8, wherein said Fe-based alloy substantially comprises nano-scale α-Fe crystalline phase having grain size less than 20 nm.

10. The data storage system of claim 8, wherein one of said first and second shielding layers comprises said Fe-based alloy.

11. The data storage system of claim 8, wherein each of said first and second shielding layers comprises said Fe-based alloy.

12. An Fe-based alloy having a composition of $(Fe_a M_{(100-a)})_{100-b} H_b$, wherein M represents at least one element selected from the group consisting of Nb, Zr, Ta, Hf, Ti, V, and Si, and wherein a and b are atomic percentages having values such that $85<=a<=97$ and $4<=b<=12$, said alloy substantially comprising nano-scale α-Fe crystalline phase having grain size less than 20 nm.

13. The Fe-based alloy of claim 12, wherein said alloy is in a film state.

14. An Fe-based alloy having a composition consisting of $(Fe_a M_{100-a})_{(100-b)} O_b$, wherein M represents at least one element selected from the group consisting of Nb, V, and Ta, and wherein a and b are atomic percentages having values such that $85<=a<=97$ and $4<=b<=12$.

15. The Fe-based alloy of claim 14, wherein said alloy substantially comprises nano-scale α-Fe crystalline phase having grain size less than 20 nm.

16. The Fe-based alloy of claim 14, wherein said alloy is in a film state.

17. A thin-film magnetic read head comprising:

a first shielding layer;

a read gap of insulating material formed on said first shielding layer;

a magnetoresistive stripe disposed within said read gap and including a biasing layer of soft magnetic material, said soft magnetic material comprising, an Fe-based alloy having a composition consisting of $(Fe_a M_{(100-a)})_{(100-b)} O_b$, wherein M represents at least one element selected from the group consisting of Nb, V and Ta, and wherein a and b are atomic percentages having values such that $85<=a<=97$ and $4<=b<=12$;

first and second conductive elements coupled to said magnetoresistive stripe; and a second shielding layer formed over said read gap and electrically isolated from said magnetoresistive stripe and said first and second conductive elements.

18. The thin-film head of claim 17, wherein said Fe-based alloy substantially comprises nano-scale α-Fe crystalline phase having grain size less than 20 nm.

19. The thin-film head of claim 17, wherein one of said first and second shielding layers comprises said Fe-based alloy.

20. The thin-film head of claim 17, wherein each of said first and second shielding layers comprises said Fe-based alloy.

21. A data storage system comprising:

a magnetic storage medium having a recording surface;

a slider for supporting a magnetic head assembly in close proximity to said recording surface, said magnetic head assembly including a thin-film magnetic read head comprising, a first shielding layer, a read gap of insulating material formed on said first shielding layer, a magnetoresistive stripe disposed within said read gap and including a biasing layer of soft magnetic material, said soft magnetic material comprising, an Fe-based alloy having a composition consisting of $(Fe_a M_{(100-a)})_{(100-b)} O_b$, wherein M represents at least one element selected from the group consisting of Nb, V, and Ta, and wherein a and b are atomic percentages having values such that $85<=a<=97$ and $4<=b<=12$, first and second conductive elements coupled to said magnetoresistive stripe, and a second shielding layer formed over said read gap and electrically isolated from said magnetoresistive stripe and said first and second conductive elements; and means for providing relative motion between said magnetic head assembly and said recording surface.

22. The data storage system of claim 21, wherein said Fe-based alloy substantially comprises nano-scale α-Fe crystalline phase having grain size less than 20 nm.

23. The data storage system of claim 21, wherein one of said first and second shielding layers comprises said Fe-based alloy.

24. The data storage system of claim 21, wherein each of said first and second shielding layers comprises said Fe-based alloy.

* * * * *